United States Patent [19]

Seufert

[11] Patent Number: 5,372,378
[45] Date of Patent: Dec. 13, 1994

[54] METHOD AND DEVICE FOR THE OPERATIVE INFLUENCING OF DAMPING ASSEMBLIES OF A VEHICLE

[75] Inventor: Robert Seufert, Rottershausen, Germany

[73] Assignee: Fichtel & Sachs AG, Schweinfurt, Germany

[21] Appl. No.: 970,096

[22] Filed: Nov. 2, 1992

[30] Foreign Application Priority Data

Nov. 4, 1991 [DE] Germany .............. 4136261

[51] Int. Cl.$^5$ .................................. B60G 11/26
[52] U.S. Cl. ................... 280/707; 280/714; 364/424.05
[58] Field of Search ............ 280/707, 714; 364/424.05; 188/299

[56] References Cited

U.S. PATENT DOCUMENTS

| | | | |
|---|---|---|---|
| 4,616,848 | 10/1986 | Sugasawa et al. | 280/707 |
| 4,856,815 | 8/1989 | Tanaka et al. | 280/707 |
| 4,887,699 | 12/1989 | Ivers et al. | 280/714 |
| 5,100,166 | 3/1992 | Mitsui | 280/707 |
| 5,173,858 | 12/1992 | Wada et al. | 280/707 |

FOREIGN PATENT DOCUMENTS

| | | | |
|---|---|---|---|
| 3835057 | 4/1989 | Germany . | |
| 4274916 | 9/1992 | Japan | 280/707 |

*Primary Examiner*—Richard M. Camby
*Assistant Examiner*—Paul Dickson
*Attorney, Agent, or Firm*—Brumbaugh, Graves, Donohue & Raymond

[57] ABSTRACT

A method is submitted for the operative influencing of a damping supporting system mounted between a chassis and a body of a motor vehicle, which system has at least one damping assembly (12) mounted between the chassis and the body of the vehicle, in which method the damping properties of at least a part of the damping assemblies (12) are modified depending upon at least one operational state quantity (BZG) between at least three damping characteristics of different damping intensity. In the method, when a change between a first and a second damping characteristic is desired, both being softer than at least one third damping characteristic, particularly when the second damping characteristic is harder than the first, switching over to the third damping characteristic is effected temporarily in an interval between the effectiveness of the first and the effectiveness of the second damping characteristic.

26 Claims, 4 Drawing Sheets

METHOD AND DEVICE FOR THE OPERATIVE INFLUENCING OF DAMPING ASSEMBLIES OF A VEHICLE

BACKGROUND OF THE INVENTION

The invention relates to a method of operative influencing of a damping supporting system mounted between a chassis and a body of a motor vehicle, which system has at least one damping assembly mounted between the chassis and the body of the vehicle, in which method the damping properties of at least a part of the damping assemblies are modified depending upon at least one operational state quantity between at least three damping characteristics of different damping intensity.

In known methods of this generic type the values of the operational state quantities are made available either directly by sensors or by computing units situated downstream of the sensors. Usually, there are respectively associated with the individual damping characteristics an upper and a lower limit of the damping requirements signalled by the operational state quantity. Switching over to a specific one of the damping characteristics is then performed if the damping requirement signalled by the operational state quantity exceeds the lower threshold value associated with this damping characteristic and does not reach the corresponding upper threshold value. The known methods of influencing the supporting system of a vehicle are thus only able to react to the stimulations of the vehicle body detected through the value for the time being of the operational state quantity and to set the damping assemblies to a damping characteristic corresponding to the value for the time being of the operational state quantity.

Known, for example, from DE-38 35 057-A1 is a process whereby, on the occurrence of long-wave pitch stimulations, i.e., oscillations of the vehicle body in the direction of travel the damping intensity is adjusted depending upon the oscillation amplitude. On the exceeding of a threshold value of the amplitude there is carried out in addition a regulation of the level of the vehicle body. This process also reacts only to the driving situation for the time being represented by the oscillation amplitude, in which the vehicle actually finds itself. In the same way as the other known methods, the process known from DE-38 35 057-A1 still does not make it possible either to counteract in good time the stimulations to the vehicle body. The adjustment to an intense damping characteristic over a lengthy period necessary for the damping of the built-up stimulations runs contrary to the wish, on grounds of comfort, to leave the damping assemblies, as long as possible, set to as soft as possible a damping characteristic.

SUMMARY OF THE INVENTION

As opposed to the foregoing it is the object of the invention to provide a method of the generic type which not only reacts to the damping requirement indicated from time to time by the operational state quantity, but also prevents the building up of stimulations of the vehicle body requiring a sizeable damping need.

This object is achieved according to the invention in that, when a change between a first and a second damping characteristic is desired, both of which are softer than at least a third damping characteristic, particularly when the second damping characteristic is harder than the first, switching over to the third damping characteristic is effected temporarily in an interval between the effectiveness of the first and the effectiveness of the second damping characteristic.

When the second damping characteristic is harder than the first, this indicates that the stimulations to the vehicle body are building up. If, in this case, switching over is effected for a time to the third damping characteristic which is harder than the first and second damping characteristics, then this will make it possible for this time interval to increase the damping force and thereby counteract the body stimulations which are building up. By this means, it will frequently be possible to avoid a long lasting adjustment of a hard damping characteristic to the guaranteed degree of driving safety. The damping assemblies can thus, over a time average, be set to a softer damping characteristic, which results in a more comfortable drive.

If, on the other hand, the second damping characteristic is softer than the first, this shows that the vehicle body excitations are dying out. In this case, a brief switching over to a third, harder damping characteristic can accelerate still further the reduction of the body excitations, so that in this case also in the time average a softer damping characteristic can be set for a longer period.

In order to be able to counteract as effectively as possible the body excitations detected, it is proposed that the hardest available damping characteristic should be selected as the third one. In this connection it is of further advantage if the effectiveness of the third damping characteristic is retained for a further predetermined period of time. In order also to be able to gain effectively an influence upon the body excitations, it is proposed that the predetermined time period should be greater than the system-conditioned switching time which would be necessary for a direct change from the first to the second damping characteristic.

On the representation of the third damping characteristic by means of a third throttling path and the representation of the first and second damping characteristics by connecting a corresponding first throttling path, or a corresponding second throttling path in parallel to the third throttling path, according to a third example of embodiment of the invention, the switching processes of the opening of one and the closing of another of the two first and second throttling paths one after the other, necessary for the transition between the first and the second damping characteristic, will be able to take place without a time overlap.

However, as an alternative to this, it is also possible that, on the representation of the third damping characteristic by a third throttling path, and the representation of the first and second damping characteristics by connecting a corresponding first throttling path or a corresponding second throttling path in parallel to the third throttling path, the switching process of the opening of one and the closing of another of the two first and second throttling paths, necessary for the transition between the first and the second damping characteristic, could take place in succession and separated by a predetermined time duration.

In order to be able to act preventively on body excitations of the vehicle, it is proposed that the effectiveness of the third damping characteristic should be retained for a specific period which will be sufficient, after having left the effectiveness of the first damping characteristic, to make a noticeable contribution to the damping operation in the following period. The predetermined period may be arrived at, for example, in a test drive. A satisfactory compromise between adequate influence on body excitations of the vehicle and the longest possible maintaining of a soft damping characteristic may be achieved if the predetermined time interval is chosen between 100 ms and 500 ms, preferably about 300 ms.

In a further embodiment of the invention it is possible to select the specific time interval to be constant. As an alternative to this, however, it is also possible for the predetermined time interval to be chosen to match in terms of value the one value of the operational state quantity.

According to another further embodiment of the invention it is possible to initiate the maintenance of the third damping characteristic during the predetermined time depending on a further operational state quantity. In this case, the method according to the invention can be added on depending on the value of the further operational state quantity. The further operational state quantity may be formed, for example, from the first time derivation of the operational state quantity.

In order to be able to prevent a continuing to and fro switching between the various damping characteristics, it is proposed that after a change from a first softer to a second harder damping characteristic the switching back from the second harder damping characteristic to the first softer damping characteristic should be allowed only after a further predetermined time interval has expired.

To be able to set the damping properties of the damping assembly always on the basis of the most possible actual values of the operational state quantity it is proposed that the operational state quantity be detected with a repetition frequency of between 50 Hz and 200 Hz, preferably of about 100 Hz.

The invention relates further to a device for carrying out the method of the invention. With regard to the advantages achievable with this device reference is made to the discussion of the method of the invention. Advantageous and preferred constructions of the device of the invention are given in the claims.

The invention is explained in greater detail below in conjunction with embodiments shown in the drawings, wherein:

DESCRIPTION OF THE EMBODIMENT

Figure 1:
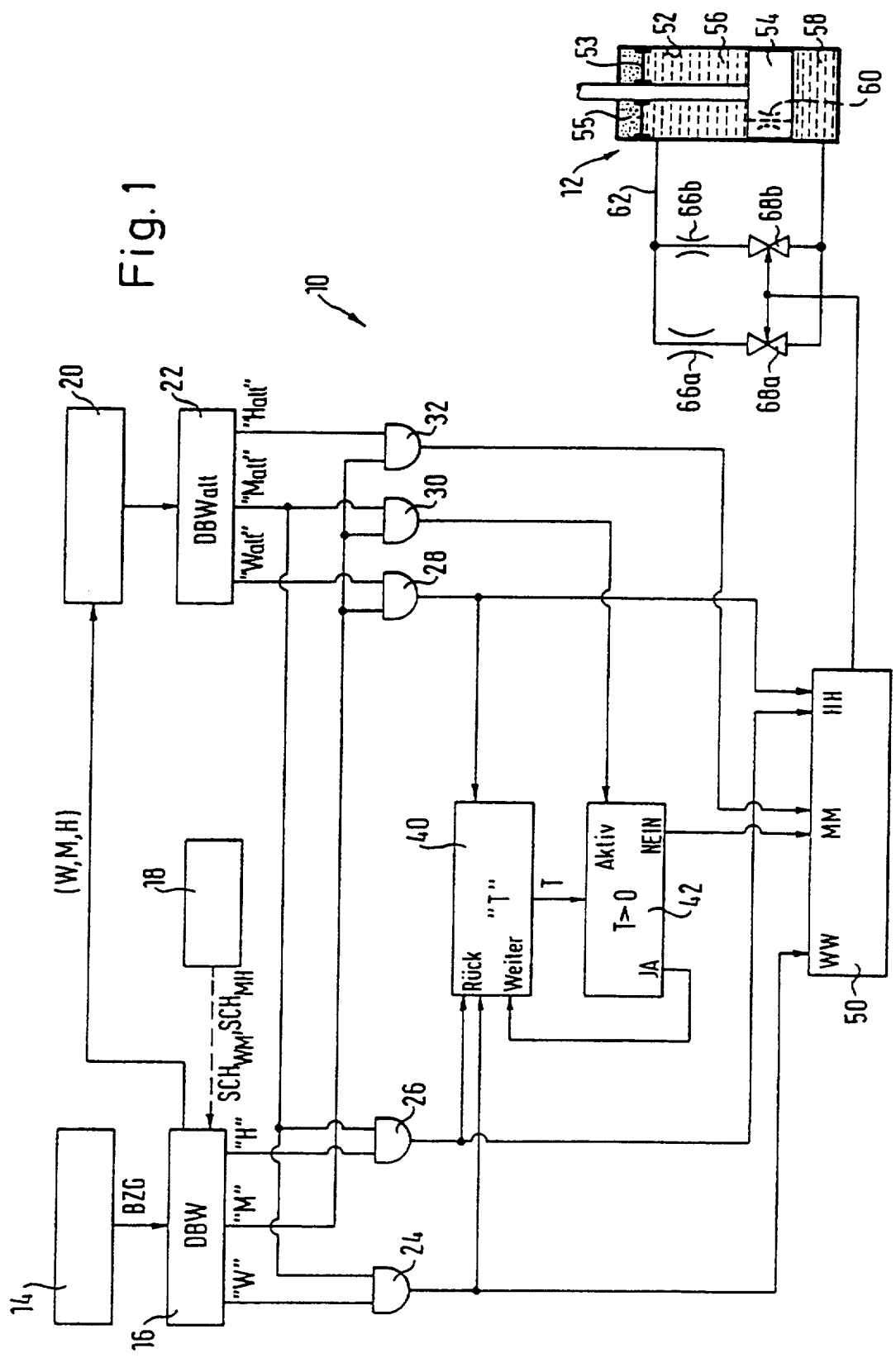
FIG. 1 is a block circuit diagram of a device for carrying out the method of the invention.

The device represented in FIG. 1 in the form of a block circuit diagram and denoted hereinafter by 10 is used for switching over between three damping characteristics of the damping assemblies of a vehicle, for example oscillation dampers 12 (only one being shown in FIG. 1), namely between a soft, a medium and a hard damping characteristic.

A detection device 14 detects the value of an operational state quantity BZG of the vehicle and may be formed, for example, by a plurality of sensors with evaluation and valuation electronics connected downstream of them. Thus, for example, a steering angle sensor, a throttle valve angle sensor, a vehicle speed sensor, an engine speed sensor, a brake pressure sensor, vehicle body acceleration sensors, and wheel acceleration sensors may be provided. From the value of the steering angle and the vehicle speed it will be possible, for example, to ascertain the transverse acceleration affecting the vehicle according to the Ackermann relation. The values of vehicle speed, throttle valve angle, engine speed and brake pressure may be called upon for ascertaining the longitudinal acceleration. By means of differentiating elements it will be possible to obtain the transverse jolt or the longitudinal jolt from the transversal or longitudinal accelerations. The signals of the vehicle body acceleration sensors and of the wheel acceleration sensors may be, for example, processed with the use of amplitude and frequency evaluation circuits. From the values of transverse acceleration, transverse jolt, longitudinal acceleration, longitudinal jolt and of the amplitude and frequency processed body and wheel eccelerations it will then be possible to obtain in an evaluation circuit the value of the operational state quantity BZG.

The detection device 14 detects the value of the operational state quantity on a continuous basis, e.g., with a repetition frequency of 100 Hz, and transmits the actual value of the operational state quantity BZG at any time of detection $t_n$ to a damping requirement determination device 10. The damping requirement determination device 16 compares the value of the operational state quantity BZG with two threshold values $SCH_{WM}$ for switching between the soft damping characteristic and the medium damping characteristic, or with one threshold value $SCH_{MH}$ for the switching between the median and the hard damping characteristic. These two threshold values $SCH_{WM}$ and $SCH_{MH}$ are supplied to the damping requirement determination device by an additional device 18.

If the value of the operational state quantity BZG lies below the threshold value $SCH_{WM}$ for switching between the soft and the medium damping characteristic, the damping requirement determination device 16 establishes that the setting of the soft damping characteristic is required. If the value of the operational state quantity BZG lies between the threshold value $SCH_{WM}$ and the threshold value $SCH_{MH}$, the damping requirement determination device 16 establishes that the setting of the medium damping characteristic is required. If the value of the operational state quantity BZG lies finally above the threshold value $SCH_{MH}$, the damping requirement determination device 16 establishes that a setting of the hard damping characteristic is required.

Depending on the result of the damping requirement determination the damping requirement determination device 16 supplies an actual damping requirement value DBW. In more precise terms, a high voltage level is applied to one of three outputs "W", "M" and "H" (i.e. "soft", "medium" and "hard") of the damping requirement determination device 16 correspondingly to a demand for a soft, a medium or a hard damping characteristic, while the other two outputs are held respectively at a low voltage level. Additionally, the result of the damping requirement determination is passed on by the damping requirement determination device 16 to an intermediate store 20.

The intermediate store 20, every time a new damping requirement value DBW is supplied to it by the damping requirement determination device 16, transmits the damping requirement value DBWalt last supplied to it and corresponding to the detection time $t_{n-1}$ to a indicating device 22 for the old ("alt") damping requirement value. Precisely as with the damping requirement determination device 16 a high voltage level is applied correspondingly to the old damping requirement value DBWalt to one of three outputs "Walt", "Malt" and "Halt" (i.e. "soft-old", "medium-old" and "hard-old") of the indicating device 22, while the other two outputs are respectively held at a low voltage level.

The outputs "W" (=soft), "M" (=medium) and "H" (=hard) of the damping requirement determination device 16 which indicate the damping requirement value DBW, and the outputs "Walt", "Malt" and "Halt" of the display device 22 which indicate the "old" damping requirement value DBWalt, are connected with the inputs of AND gates 24, 26, 28, 30 and 32. At the output of an AND gate there is applied a high voltage level only when at the same time there is a high voltage level at both inputs of the AND gate. On the other hand, if there is a high voltage level only at one of the inputs of the AND gate, and at the respectively other input there is a low voltage level, or there is at both inputs of the AND gate a low voltage level, the output of the AND gate shows a low voltage level.

If, for example, the damping requirement changes from soft (high voltage level at the "Walt" output of the indicating device 22) to medium damping requirement (high voltage level at the output "M" of the damping requirement determination device 16), the inputs of the AND gate 28 only both show a high voltage level. By means of the high voltage level produced hereby also at the output of the AND gate 28, on the one hand a setting signal is supplied to a timing element 40, and on the other hand a hard damping requirement is signalled to a switching device 50.

The timing element 40 receives the setting signal at an input "SET" and is thereby set tea predetermined value $T_0$, for example 300 ms. The switching device 50 receives the demand signal for a hard damping characteristic at an input HH. The switching device 50 checks whether the oscillation damper 12 is already set to the hard damping characteristic. If this is not the case the switching device 50 issues a closure order to two electromagnetically actuatable shut-off valves 68a and 68b of the oscillation damper 12.

An inner space 52 of a one-tube oscillation damper 12 contains a pressurized gas filled compensation chamber 55 delimited by a floating piston 53 and is moreover divided by a piston 54 into an upper working chamber 56 filled with damping fluid and a lower working chamber 58 filled with damping fluid. The two working chambers 56 and 58 are on the one hand in connection via at least one throttling path 60, possibly, however, also via two throttling paths allowing passage selectively depending on the direction of movement of the piston 54. A throttling path may be formed for example by one valve impinged by a spring. On the other hand, there is a connection of the two working chambers 56 and 58 through a bypass 62. The bypass 62 has two throttling paths 66a and 66b extending parallel to each other, which can respectively be closed by an electromagnetically actuatable shut-off valve 68a or 68b. As shown in FIG. 1, the throttling path 66a has a greater passage cross-section than the throttling path 66b. The throttling path 66a has therefore a softer damping characteristic than the throttling path 66b. If both shut-off valves 68a and 68b are closed, the consequence will be a harder damping characteristic. If the shut-off valve 68b is open, while, on the other hand, shut-off valve 68a is closed, this means a medium damping characteristic. Finally, if the shut-off valve 68a is open, and the shut-off valve 68b closed, this means a soft damping characteristic. A simultaneous opening of both shut-off valves 68a and 68b is not provided for in the present example of embodiment and should be prevented as far as possible.

If subsequently the demanded damping requirement remains at the medium damping characteristic, i.e. high signal levels are applied only at the output "M" of the damping requirement determination device 16 and at the output "Malt" of the indicating device 22, the output of the AND gate 30 will have only a high signal level. By this means an activation signal is produced at a comparator 42, which is received by this at an input "ACTIVE". By the activation signal the comparator 42 is made to check whether the timing element 40 has, or has not, a value T different from nil. Then, the value T of the timing element 40 is supplied additionally to the comparator 42.

If the set time interval $T_0$ for the above-described transition from the soft to the medium damping characteristic has not yet elapsed, the comparator 42 applies at its YES output a positive voltage signal which is received by the timing element at an input "GO ON". By the reception of this signal the timing element 40 is enabled to allow the predetermined time interval $T_0$ to run further. As long as a high voltage level is present at the YES output of the comparator 42, a NO output of the comparator 42 is held at a low voltage level.

If the required damping characteristic remains until the time interval $T_0$ has elapsed at the medium damping characteristic, it will be established by the comparator 42 on the elapsing of the time interval that the value T of the timing element 40 is no longer above nil. Subsequently, a low voltage level is applied at the YES output of the comparator 42 and a high one is applied at the NO output of the comparator 42. The NO output of the comparator 42 is connected with an input MM of the switching device 50. By a high voltage level at the NO output of the comparator 42 a medium damping requirement is indicated to the switching device 50. Subsequently, the switching device 50 issues a closure order to the shut-off valve 68a, and an opening instruction to the shut-off valve 68b.

However, if the damping requirement, before the elapsing of the time interval $T_0$, drops back to the soft damping characteristic (high voltage level at the output "W" of the damping requirement determination device 16 and high voltage level at the output "Malt" of the indicating device 22), there is applied only at the AND gate 24 at both inputs a high voltage level. By means of the high voltage level hereby produced at the output of the AND gate 24 a resetting signal is issued to the timing element 40. The timing element 40 receives this reset signal at an input "RESET" and resets the value T of the timing element 40 at nil. Furthermore, by means of the high voltage level at the output of the AND gate 24 of the switching device 50 a soft damping requirement is signalled. The switching device 50 receives this signal through an input WW and thereupon issues a closure instruction to the shut-off valve 68b and an opening instruction to the shut-off valve 68a.

However, if the damping requirement changes from the medium damping characteristic to the hard damping characteristic (high voltage level at the output "H" of the damping requirement determination device 16 and high voltage level at the output "Malt" of the indicating device 22) there is applied at the AND gate 26 a high voltage level at both inputs. By means of the high voltage level hereby produced at the output of the AND-gate 26 a resetting signal is issued to the timing element 40 which the timing element receives at its input "RESET" and as a consequence of this the value T of the timing element 40 is reset to nil. Furthermore, by the high voltage level at the output of the AND-gate 26 a harder damping requirement is signalled to the switching device 50. Thereafter the switching device 50 issues to the shut-off valves 68a and 68b respectively a closure instruction.

If the damping requirement changes from the hard damping characteristic back to the medium damping characteristic (high voltage level at the output "M" of device 16 and high voltage level at the output "Halt" of the indicating device 22) the AND gate 32 has only a high voltage level at its two inputs. As a consequence of the high voltage level resulting from this at the output of the AND gate 32 a medium damping requirement will be signalled to the switching device 50. Thereupon the switching device 50 issues to the shut-off valve 68a a closure instruction, and an opening instruction to the shut-off valve 68b.

If the damping requirement remains at the soft damping characteristic or at the hard damping characteristic, no control signals of any kind must be issued to influence the switching device 50 or the timing element 40 and the comparator 42 associated with it. For this reason no AND gates are provided which connect the outputs "W" of the damping requirement determination device and "Walt" of the indicating device 22 or the outputs "H" and "Halt" of these two devices together.

Furthermore, in practice, because of the high repeat frequency of the operational state quantity detection of 100 Hz, it may not happen that the damping requirement value DBW changes directly from hard to soft or directly from soft to hard. Also for this reason no AND gates are provided which join together the outputs "W" of the damping requirement determination device 16 and "Halt" of the indicating device 22 or the outputs "H" and "Walt" of these two devices.

Let it be pointed out once again at this point that in the example of embodiment according to FIG. 1, on a change of the damping characteristic from the soft to the medium damping characteristic for a predetermined time interval $T_0$, for example 300 ms, the hard damping characteristic is set, and after the elapsing of the predetermined time $T_0$ the system switches back to the medium characteristic. The changes from the medium to the hard damping characteristic, from the hard to the medium damping characteristic and from the medium to the soft damping characteristic, on the other hand, are performed without delay. Care is simply taken here that when one of the shut-off valves 68a and 68b opens, the respective other one, on the other hand, closes, and to the one shut-off valve the opening instruction is not given till the other shut-off valve is completely closed.

Figure 2:
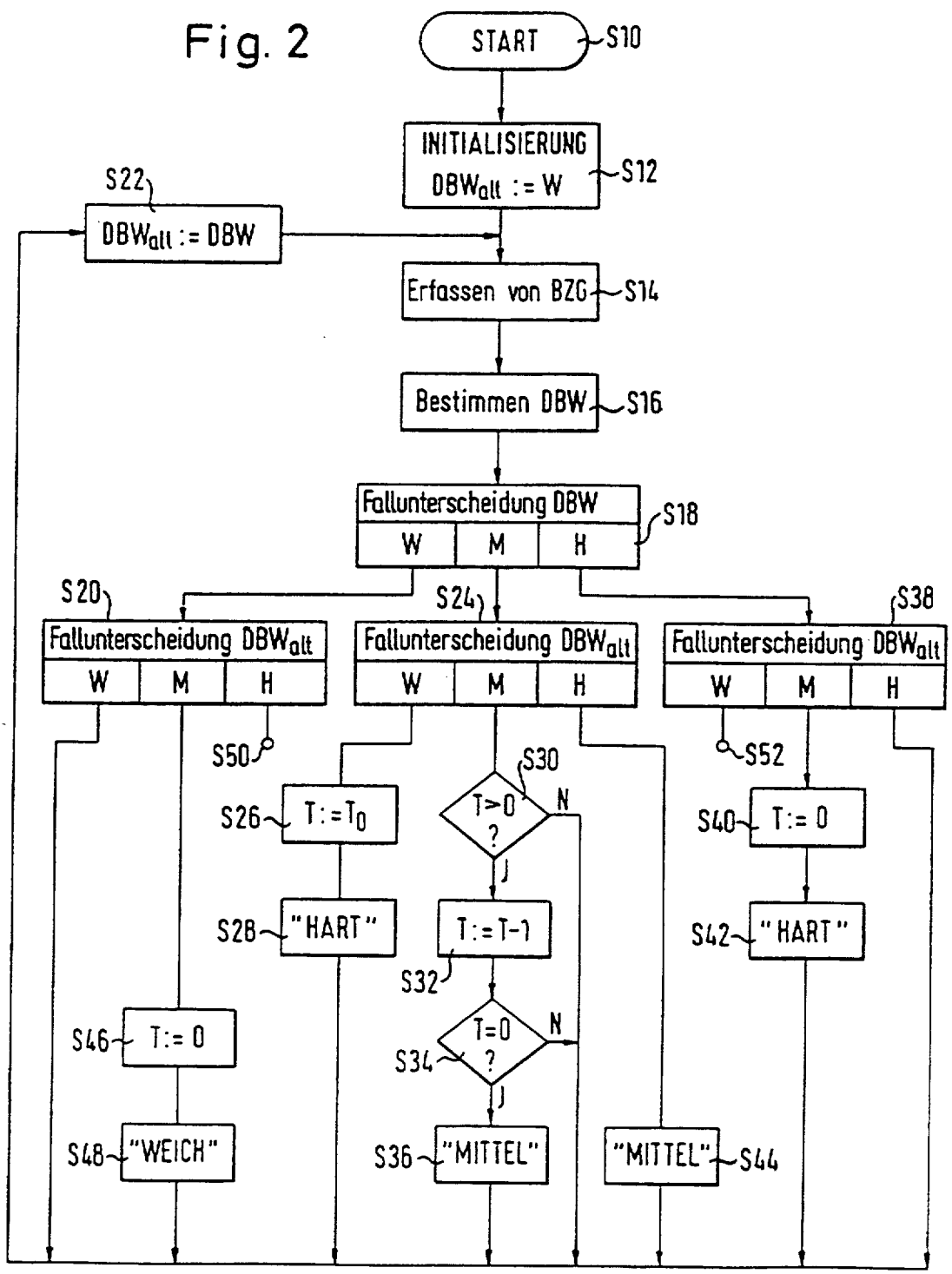
FIG. 2 is a flow chart of a program for carrying out the method of the invention.

The device described on the basis of FIG. 1 can be operated for example by means of a program which is represented in FIG. 2 by means of a flow diagram. After the start of the program at a step S10 an initialization of system variables is performed in a step S12. In this case for example, one DBWalt variable indicating the "old" damping requirement value is set to value W (for the soft damping characteristic). In a step S14, subsequently, the value for the time being of the operational state quantity BZG is detected.

From the value for the time being of the operational state quantity BZG, in a step S16 the momentary damping requirement value DBW is determined by a comparison of the value of the operational state quantity BZG with the above-mentioned threshold values $SCH_{WM}$ and $SCH_{MH}$. As a result of the step S16 the variable DBW has the value W for the soft damping characteristic, the value M for the medium damping characteristic, or the value H for the hard damping characteristic. In a step S18 a case differentiation is performed according to the value of the variable DBW.

If a soft damping requirement is demanded, the program moves on to a step S20 in which a case differentiation is performed according to the value of the variable DBWalt, i.e. depending on the damping requirement value for the respective preceding detection point of time. As the variable DBWalt on the first passage of the program still shows the value W set in the initializing step S12, i.e. as soft damping requirement continues to be signalled, no switching signal must be emitted, and the program moves on to a step 22 in which the actual damping requirement value DBW is transferred into the variable for the "old" damping requirement value DBWalt.

Thereupon, in step S14, a new value of the operational state quantity BZG is detected, and in step S16 the new damping requirement value DBW is determined. If the new damping requirement value DBW now indicates a medium damping requirement, the procedure, after the case differentiation in step S18, moves on to a step S24, in which a case differentiation is performed according to the "old" damping requirement value DBWalt.

As the last detected damping requirement value signalled a soft damping characteristic, the program moves on to a further step S26, in which the timing element 40 is set at a predetermined $T_0$, for example 300 ms (if a counter is used as timing element 40, the time interval of 300 ms will have a counter value of 30 corresponding to it at a detection frequency of 100 Hz). The program now travels on to a step S28 in which the hard damping requirement is signalled to the switching device 50. Thereupon, this program course is ended with step S22 in which the old damping requirement value DBWalt is actualized. The variable DBWalt thus has now the value M for medium damping requirement.

If after a renewed passing through the steps S14 and S16 a medium damping requirement continues to be indicated, the program, after passing through the steps S18 and S24, moves on to a step S30 in which a check is made whether the value T of the timing element 40 is greater than nil.

As in the preceding program course the timing element 40 in step S26 was set to value 30 the determination in step S30 runs positively and the program moves on to a step S32 in which the value T of the timing element 40 is reduced by "one". The subsequent checking in a step S34 as to whether the timing element 40 now has value T=0 runs negatively in this program course and the program ends this program course in step S22. If during the further program courses a medium damping requirement continues to be determined, by passing through the step S32 the value T of the timing element 40 is continuously reduced.

Let it now be assumed that on a further program course the timing element 40 shows value T=1 and medium damping requirement continues to be signalled. In this case it is established in S30 that the value T continues to be greater than nil. In step S32 the value T is reduced by 'one', so that the timing element now shows the value T=0. The subsequent checking in step S40 runs therefore positive, so that in a step S36 to the timing device 50 a medium damping requirement is signalled.

As was explained hereinabove, on the change of the demanded damping adjustment of the oscillation damper 12 from a soft damping characteristic to a medium damping characteristic the circuit is set initially to the hard damping characteristic and a timing element 40 is set to a predetermined value $T_0$. After the time interval $T_0$ has elapsed the circuit is switched back to the medium damping characteristic. By means of such a change of the demanded damping characteristic from the soft to the medium damping characteristic it is indicated that excitations of the vehicle body are about to take place. By means of the early switching over to the hard damping characteristic these body excitations can be counteracted early, so that, in a great number of cases, it is not necessary for a fairly long time to switch over to the hard damping characteristic. Consequently, on a time average, it is possible to drive on longer with a softer damping characteristic, this being felt to be comfortable by the occupants of the vehicle.

Let it be assumed hereinbelow that the medium damping characteristic has been set, i.e. that the variable DBWalt shows the value M. If now, on a renewed running of the program a harder damping requirement (DBW=H) is established in steps S14 and S16 the program moves on from step 18 to a step S38, in which a case differentiation is performed according to the damping requirement value DBWalt. As the variable DBWalt, as set out hereinabove, shows the value M, the program moves on to a step S40 in which the value T of the timing element 40 is reset to nil, and to a step S42 in which a hard damping requirement is signalled to the switching device 50.

If the damping requirement after a change of damping requirement from soft to medium has changed to hard already before the elapsing of the time element 40, the timing element 40 is therefore held in the step S40 and set to nil. If the damping requirement remains subsequently at hard (DBW=H) no switching processes must be set off, and the program passes in succession through the steps S14, 816, S18, S38 and S22.

If the damping requirement changes back again to medium (DBW=M), the program passes through the steps S14, S16, S18, S24 and a step S44, in which medium damping requirement is signalled to the switching device 50. Subsequently, this program course ends with step S22.

If the damping requirement drops further from the medium damping requirement to the soft damping requirement (DBW=W; DBWalt=M), the program, after having passed through steps S14, S16, S18 and S20 continues on to a step S46 in which the value of the timing element 40 is reset to nil, and to a step S48 in which soft damping characteristic requirement is signalled to the switching device 50. Thereupon the course of the program ends with step S22.

If the detection of the operational state quantity in step S14 and the determination of the damping requirement value in step S16 are performed with a repetition rate which is greater than the maximum alteration rate of the damping requirement value DBW which occurs in practice, which is the case at a repeat frequency of 100 Hz, then it is ruled out that in two consecutive program passages there will take place a direct transition of the damping requirement value from the soft to the hard damping characteristic (DBW=H; DBWalt=W) or from the hard to the soft damping characteristic (DBW=W; DBWalt=H). The corresponding cases must therefore not be taken into consideration in the flow diagram according to FIG. 2, as is indicated at S50 and S52.

Figure 3:
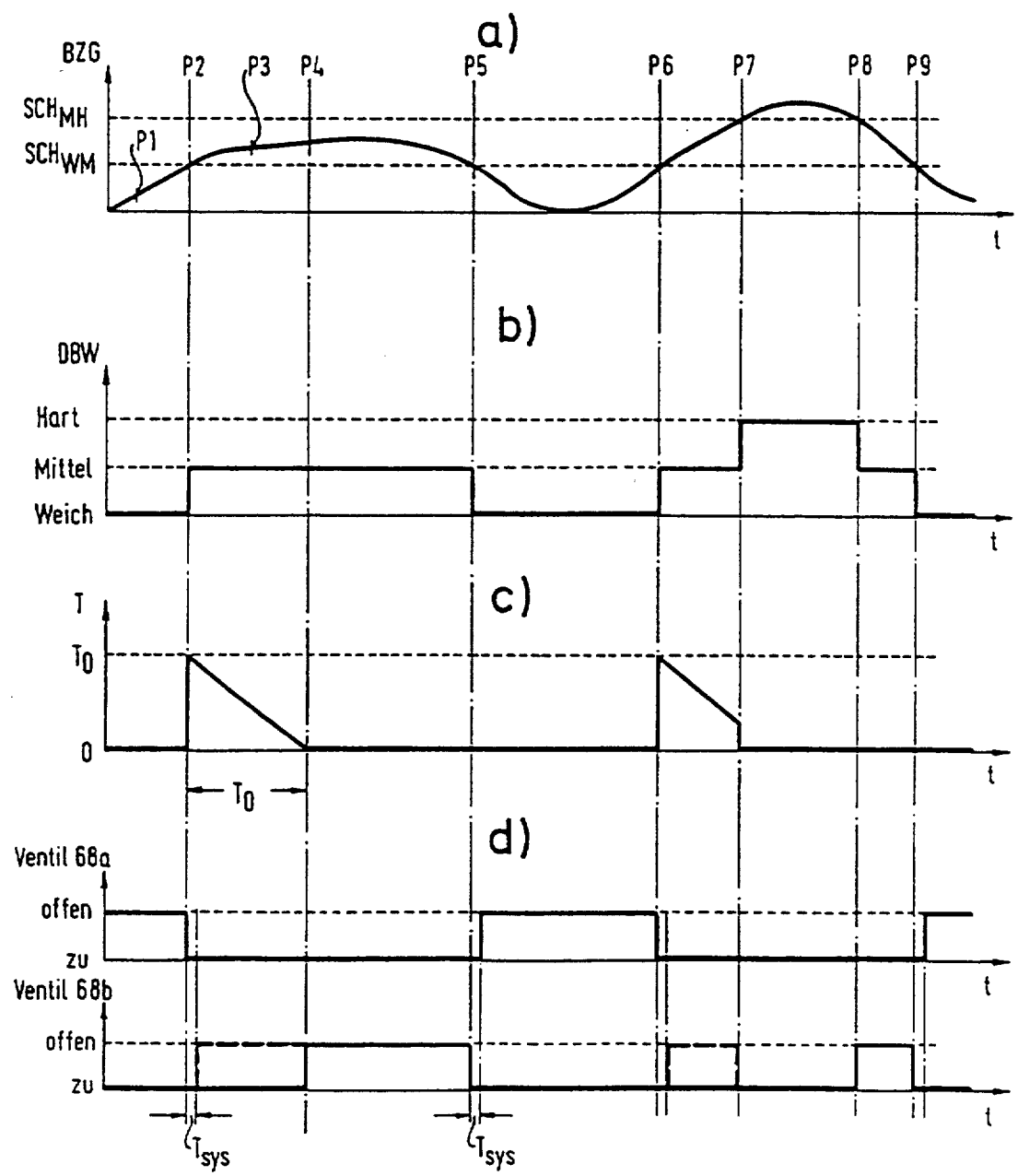
FIG. 3 shows the lapse diagrams to explain the *modus operandi* of the method of the invention.

The operation of the device 10 represented in FIG. 1 with the aid of the program according to FIG. 2 will be desscribed hereinunder on the basis of the time progression diagrams shown in FIG. 3. Represented in FIG. 3a for the sake of example is a time progression of the operational state quantity BZG, whereby the threshold values $SCH_{WM}$ for a change between the soft and the medium damping characteristics, and $SCH_{MH}$ for a change between the medium and the hard damping characteristics, are entered as dotted lines parallel with the time axis t. Shown in FIG. 3b is the time progression of the damping characteristic DBW determined from this course of the operational state quantity BZG wherein the time axis t represents a soft damping requirement, and the medium and hard damping requirements are represented by dotted lines parallel with the time axis t. Shown in FIG. 3c is the time progression of the value T of the timing element 40. Here, in FIG. 3c, the predetermined time value $T_0$ has been entered as a dotted line parallel with the time axis. Finally, the switching states of the shut-off valves, 68a for soft damping characteristic and 68b for medium damping characteristic have been represented in FIG. 3d, and in the diagram, respectively, the open valve state corresponds to a dotted line parallel to the time axis t, and the closed valve state corresponds to the time axis t itself.

According to FIG. 3a the operational state quantity starts at a value corresponding to a soft damping requirement (point P1). The timing element shows at this time the value nil (see FIG. 3c). The shut-off valve 68a is in its open state and the shut-off valve 68b is in its closed state (FIG. 3d).

At point P2 the operational state quantity BZG exceeds the threshold value $SCH_{WM}$ (FIG. 3a), so that now a medium damping requirement is signalled (FIG. 3b).

Thereby, the timing element 40 according to FIG. 3c is set to a predetermined value $T_0$ and the shut-off valve 68a is closed (FIG. 3d). Shut-off valve 68b continues to remain closed, so that the oscillation damper 12 is now set to a hard damping characteristic.

Subsequently, the magnitude state quantity BZG remains at a value corresponding to a medium damping requirement (cf. point P3 in FIG. 3) and the timing element 40 allows the predetermined time $T_O$ to run on continuously (FIG. 3c). After the elapsing of the predetermined time $T_0$ in point P4 an opening instruction is given to the shut-off valve 68b (FIG. 3d), so that the oscillation damper 12 is now set at the medium damping characteristic.

If the operational state quantity BZG again fails to reach the threshold value $SCH_{WM}$ at point P5, then, without delay, a closure instruction will be given to the shut-off valve 68b for the medium damping characteristic and, after it has been made sure that the valve 68b is closed, an opening instruction is given to the shut-off valve 68a for the soft damping characteristic (FIG. 3d). Thereafter the oscillation damper 12 is set to the soft damping characteristic. The two immediately consecutive closure and opening instructions are separated by a short period $T_{sys}$ to be able to ensure that in no event both shut-off valves 68a and 68b are open at the same time.

An point P6 the operational state quantity BZG again exceeds the threshold value $SCH_{WM}$ for a change between the soft and the medium damping characteristic (FIG. 3a) so that now medium damping characteristics is signalled (FIG. 3b). By this means the timing element 40 is reset to the predetermined value $T_0$ (FIG. 3c) and a closing instruction is issued to shut-off valve 68a for the soft damping characteristic (FIG. 3d).

Even before the predetermined time interval $T_0$ has elapsed the operational state quantity BZG exceeds the threshold value $SCH_{MH}$ for a change between the medium and the hard damping characteristic (FIG. 3a), so that now a hard damping characteristic is required (FIG. 3b). By this means the timing element 40 is again reset to value nil and both shut-off valves 68a and 68b remain closed, so that the oscillation damper 12 remains set at the hard damping characteristic.

If the operational state quantity BZG at point P8 does not reach the threshold value $SCH_{MH}$ for a change between the medium and the hard damping characteristic once again (FIG. 3), an opening instruction is issued immediately to the shut-off valve 68b for the medium damping characteristic (FIG. 3d).

If the operational state quantity BZG at point P9 does not reach the threshold value $SCH_{WM}$ for a change between the soft and the medium damping characteristic, then, in the first instance, a closing instruction is issued to the shut-off valve 65b for the medium damping characteristic. After the elapsing of the short period of time $T_{sys}$ an opening instruction is thereupon issued to the shut-off valve 68a for the soft damping characteristic, so that subsequently the oscillation damper 12 is set to the soft damping characteristic.

Drawl in dashed lines in FIG. 3d are the switching processes for the shut-off valve 68b for the medium damping characteristic as they would be carried out without the up-switching delay of the invention. By means of the up-switching delay of the invention not only body excitations building up in the vehicle are avoided, but also it will be possible, even in the case of a rise of the damping requirement from soft to hard which takes place in a shorter period than the predetermined time duration $T_0$, to eliminate switching processes of the shut-off valve 68b for the medium damping characteristic. Thus, without up-switching delay, the shut-off valve 68b at point P6, as a consequence of a change in damping requirement, would be open from soft to medium, in order shortly thereafter, after a transition of the damping requirement to hard, to be closed again. By means of the up-switching delay of the invention the shut-off valve 68b is not at all opened at the outset, so that two switching processes can be dispensed with.

In order, with the method of the invention for up-switching delay, to be able to prevent a continuous switching and reswitching, for example between the medium and the hard damping characteristics, there may be provided also, alongside the up-switching delay, a resetting delay by means of which, when the operational state quantity BZG fails to reach one of the threshold values $SCH_{WM}$ or $SCH_{MH}$, a further timing element is set to a predetermined value. It is not till after this further timing element has ceased to operate that switching takes place to the damping characteristic required at the time of the cessation.

Furthermore, it is possible to initiate the up-switching delay of the invention in dependence upon the value of a further operation state quantity, for example of the first time derivation of the operational state quantity BZG, and not let it run permanently.

Figure 4:
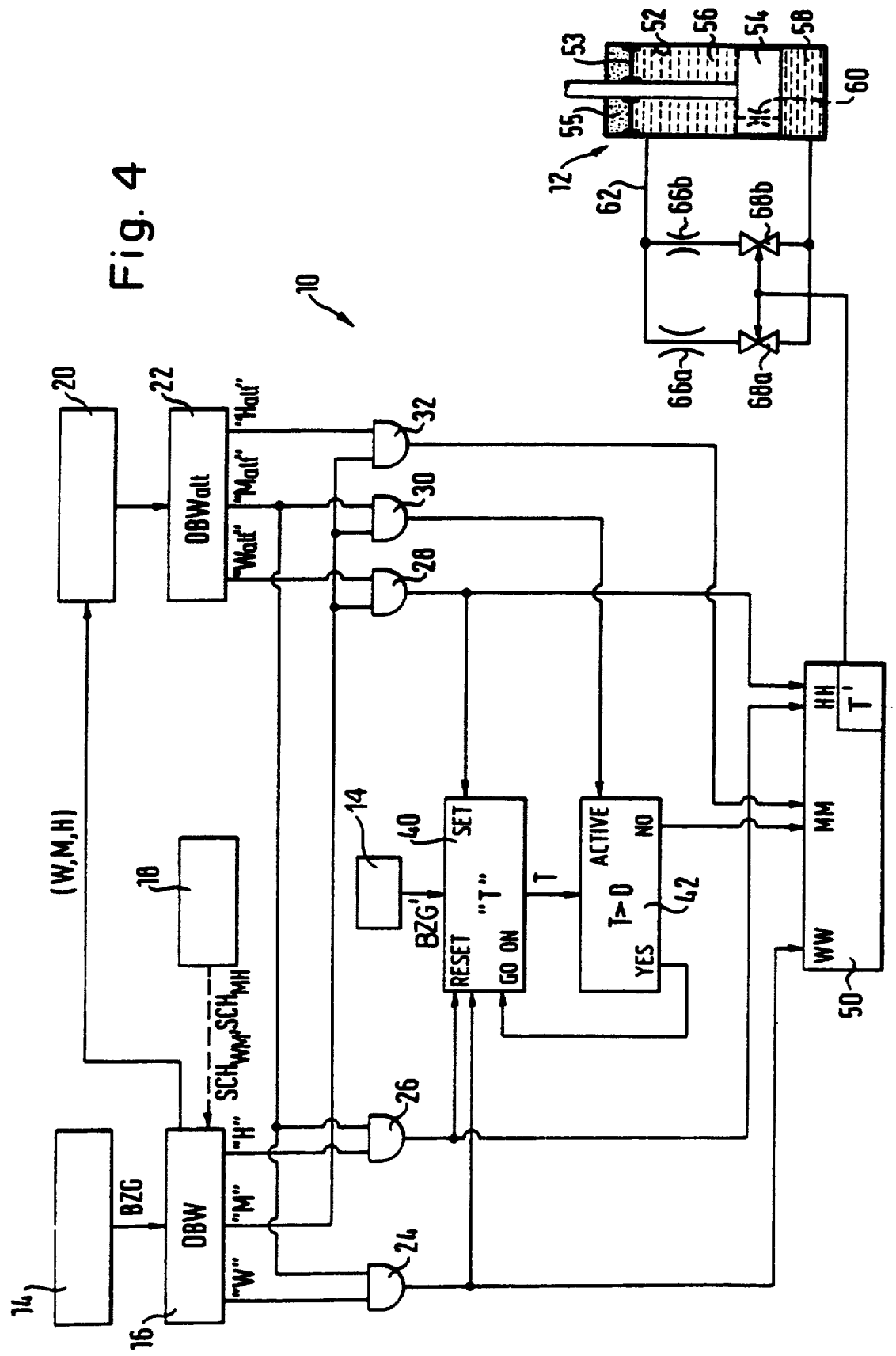
FIG. 4 is a block diagram of another circuit for carrying out the invention.

The modifications described in the preceding two paragraphs are shown in FIG. 4. A timer T' incorporated in the switching device 50 prevents switching from a harder to a softer damping characteristic. The timer T' is reset each time that the damping assembly is switched from a softer to a harder damping characteristic. Only at the end of the timer interval is any change to a softer damping characteristic commanded by the program carried out. Instead of maintaining the highest damping characteristic for a fixed time established by the timer 40 when a change from a softer to a harder damping characteristic is output by the computer 16, an operation state quantity BZG' from a detector 14' sets the time "T." Except for the aforementioned modifications, the circuit of FIG. 4 is the same as the circuit of FIG. 1.

I claim:

1. A method for controlling a damping-supporting system supporting a motor vehicle body with respect to a motor vehicle chassis, the damping supporting system including at least one damping assembly which is adjustable between a plurality of at least three damping characteristics of respective different damping intensities, including a first damping characteristic, a second damping characteristic harder than the first damping characteristic, and a third damping characteristic harder than the second damping characteristic, and control means for adjusting the damping assembly and having sensor means including at least one sensor for continuously sensing at least one operational state quantity indicative of desired damping intensities of the damping supporting system, the method comprising the steps of:

selecting a first range of the operational at least one state quantity which is indicative of a need for maintaining the first damping characteristic;

selecting a second range of the at least one operational state quantity which is indicative of a need for maintaining the second damping characteristic;

selecting a third range of the at least one operational state quantity which is indicative of a need for maintaining the third damping characteristic;

adjusting the damping assembly from the first damping characteristic to the third damping characteristic when the at least one operational state quantity changes from the first range to the second range; and whenever the damping assembly is adjusted from the first damping characteristic to the third damping characteristic upon a change in the at least one operational state quantity from the first range to the second range maintaining the damping supporting system in the third damping characteristic for a predetermined time period, provided that the at least one operational state quantity remains in the second range for the predetermined time period and then changing the damping assembly from the third characteristic to the second damping characteristic after the predetermined time period, provided that the at least one operational state quantity remains in the second range at the end of the predetermined time period.

2. A method according to claim 1 wherein the hardest damping characteristic of the plurality is used as the third damping characteristic.

3. A method according to claim 1 wherein the predetermined time period is greater than a system-conditioned switching time which is required for a direct adjustment from one damping characteristic to another.

4. A method according to claim 1 wherein the third damping characteristic is provided by a third throttling path of a damping assembly and the first and second damping characteristics are provided by selectively connecting one of a first throttling path and a second throttling path of the damping assembly in parallel with the third throttling path, and wherein each of the first and second throttling paths is opened only after the other of the first and second throttling paths is closed so that the first and second throttling paths are never open at the same time.

5. A method according to claim 1 wherein the third damping characteristic is provided by a third throttling path of the damping assembly, and the first and second damping characteristics are provided by selectively connecting one of a first throttling path and a second throttling path of the damping assembly in parallel with the third throttling path, and wherein each of the first and second throttling paths is opened only after a predetermined time after the other of the first and second throttling paths is closed so that the first and second throttling paths are never open at the same time.

6. A method according to claim 1 wherein the predetermined time period is selected such that the third damping characteristic reduces substantially a need for damping subsequent to the predetermined time period.

7. A method according to claim 1 wherein the predetermined time period is a time period of from about 100 ms to about 500 ms.

8. A method according to claim 1 wherein the predetermined time period is about 300 ms.

9. A method according to claim 1 wherein the predetermined time period is constant.

10. A method according to claim 1 wherein the predetermined time period is established in accordance with an actual value of the at least one operational state quantity.

11. A method according to claim 1 wherein after an adjustment of the damping assembly from a softer to a harder damping characteristic, adjustment from the harder damping characteristic to the softer damping characteristic is delayed until after a predetermined time interval has elapsed.

12. A method according to claim 1 wherein the at least one operational state quantity is detected with a repetition frequency in the range of from about 50 Hz to 200 Hz.

13. A method according to claim 1 wherein the at least one operational state quantity is detected with a repetition frequency of about 100 Hz.

14. A damping vehicle-supporting system interposed between a motor vehicle chassis and a motor vehicle body comprising:

at least one damping assembly mounted between the motor vehicle chassis and the motor vehicle body, the damping properties of said at least one damping assembly being adjustable between at least three damping characteristics of respective different damping intensities, including a first damping characteristic, a second damping characteristic harder than the first damping characteristic, and a third damping characteristic harder than the second damping characteristic;

sensor means having at least one operational state quantity sensor for producing data signals indicative of at least one operational state quantity;

adjusting means for adjusting the damping assembly among the damping characteristics; and data processing means responsive to data signals from the sensor means for controlling the adjusting means so as to cause the adjusting means to change the damping characteristics, the data processing means including means for producing signals indicative of, respectively, a first range of the at least one operational state quantity which is indicative of a need for maintaining the first damping characteristic, a second range of the at least one operational state quantity which is indicative of a need for maintaining the second damping characteristic and a third range of the at least one operational state quantity which is indicative of a need for maintaining the third damping characteristic, and means acting whenever the damping assembly is set to the first damping characteristic for adjusting the damping assembly to the third damping characteristic upon a change in the at least one operational state quantity from the first range to the second range and including timing means for maintaining the damping assembly set to the third damping characteristic for a predetermined time period as long as the at least one operational state quantity remains in the second range during the predetermined time period and for changing the damping assembly from the third characteristic to the second damping characteristic after the predetermined time period, provided that the at least one operational state quantity remains in the second range at the end of the predetermined time period.

15. A system according to claim 14 wherein the third damping characteristic is the hardest damping characteristic of the damping assembly.

16. A system according to claim 14 wherein the timing means establishes the predetermined time period at a value greater than a system-conditioned switching time which is required for a direct adjustment from one damping characteristic to another.

17. A system according to claim 14 wherein the third damping characteristic of the damping assembly is provided by a third throttling path of the damping assembly and the first and second damping characteristics are provided by selectively connecting one of a first throttling path and a second throttling path of the damping assembly in parallel with the third throttling path, and wherein the adjusting means is controlled by the data processing means to selectively open and close the first and second throttling paths for adjusting between the first and the second damping characteristics without any time overlap between opening of the first and second paths.

18. A system according to claim 14 wherein the third damping characteristic of the damping assembly is provided by a third throttling path of the damping assembly, and the first and second damping characteristics are provided by selectively connecting one of a first throttling path and a second throttling path of the damping assembly in parallel with the third throttling path, and wherein the adjusting means is controlled by the data processing means to open and close the first and the second throttling paths for adjusting between the first and the second damping characteristics sequentially with a predetermined delay time between the adjustments.

19. A system according to claim 14 wherein the predetermined time period is selected such that the third damping characteristic reduces substantially a need for damping subsequent to the predetermined time period.

20. A system according to claim 14 wherein the predetermined time period is a time period of from about 100 ms to about 500 ms.

21. A system according to claim 14 wherein the predetermined time period is about 300 ms.

22. A system according to claim 14 wherein the predetermined time period is constant.

23. A system according to claim 14 wherein the predetermined time period is established in accordance with an actual value of the at least one operational state quantity sensed by the operational state quantity sensor.

24. A system according to claim 14 wherein after an adjustment of the damping assembly from a softer to a harder damping characteristic, a timing means, in response to the data processing means and sensor means, delays adjustment of the damping assembly from the harder damping characteristic to the softer damping characteristic until after a predetermined time interval has elapsed.

25. A system according to claim 14 wherein the sensing means detects the at least one operational state quantity with a repetition frequency in the range of from about 50 Hz to 200 Hz.

26. A system according to claim 14 wherein the sensing means detects the at least one operational state quantity with a repetition frequency of about 100 Hz.

* * * * *

UNITED STATES PATENT AND TRADEMARK OFFICE
CERTIFICATE OF CORRECTION

PATENT NO. : 5,372,378

DATED : December 13, 1994

INVENTOR(S) : Robert Seufert

It is certified that error appears in the above-indentified patent and that said Letters Patent is hereby corrected as shown below:

Col. 4, line 29, "device 10" should read --device 16--;
Col. 5, line 39, "tea" should read --to a--;
Col. 11, line 8, "An point" should read --At point--;
Col. 12, line 45, "operational at least one" should read --at least one operational--.

Signed and Sealed this

Eighteenth Day of April, 1995

Attest:

BRUCE LEHMAN

Attesting Officer

Commissioner of Patents and Trademarks